(12) United States Patent
Chang

(10) Patent No.: US 10,396,625 B2
(45) Date of Patent: Aug. 27, 2019

(54) PROTECTOR FOR PREVENTING MOTOR DAMAGE

(71) Applicants: IEI INTEGRATION CORP., New Taipei (TW); ARMORLINE SH CORP., Shanghai (CN)

(72) Inventor: Yu-Tsung Chang, New Taipei (TW)

(73) Assignees: IEI Integration Corp., New Taipei (TW); Armorline SH Corp., Shanghai (CN)

(*) Notice: Subject to any disclaimer, the term of this patent is extended or adjusted under 35 U.S.C. 154(b) by 126 days.

(21) Appl. No.: 15/805,457

(22) Filed: Nov. 7, 2017

(65) Prior Publication Data
US 2019/0027994 A1 Jan. 24, 2019

(30) Foreign Application Priority Data
Jul. 20, 2017 (CN) .......................... 2017 1 0595780

(51) Int. Cl.
*H02K 7/108* (2006.01)
*H02K 7/116* (2006.01)

(52) U.S. Cl.
CPC ............. *H02K 7/108* (2013.01); *H02K 7/116* (2013.01)

(58) Field of Classification Search
None
See application file for complete search history.

(56) References Cited

U.S. PATENT DOCUMENTS

| | | | | |
|---|---|---|---|---|
| 4,745,823 A * | 5/1988 | Morita | ................... | F16H 55/18 74/409 |
| 5,040,430 A * | 8/1991 | Adam | ................... | E05F 11/483 49/349 |
| 5,452,622 A * | 9/1995 | Fenelon | ................... | B29C 70/84 264/242 |
| 5,956,998 A * | 9/1999 | Fenelon | ................... | E05B 81/25 292/144 |
| 6,393,929 B1 * | 5/2002 | Quere | ................... | F16H 1/16 74/411 |
| 6,591,707 B2 * | 7/2003 | Torii | ................... | F16D 3/68 74/425 |
| 6,736,022 B2 * | 5/2004 | Chang | ................... | F16H 55/14 74/439 |
| 10,145,460 B2 * | 12/2018 | Steinmaurer | ........... | F16H 55/17 |

* cited by examiner

*Primary Examiner* — Dimary S Lopez Cruz
(74) *Attorney, Agent, or Firm* — Rosenberg, Klein & Lee

(57) ABSTRACT

A protector for preventing motor damage is revealed. The protector includes a link member linked to a driving part of a motor and having a mounting groove and a first insertion hole, an elastic damping member that is placed in the mounting groove and disposed with a second insertion hole, and a driver member arranged with a projecting block and used for driving a passive member. One surface of the driver member is covered on the mounting groove to form a receiving space. The projecting block is mounted in the second insertion hole whose inner edge is closely attached to an outer edge of the projecting block. The damping member is compressed in the receiving space so that an outer edge thereof is tightly attached to an inner edge of the mounting groove and the driver member. Thereby the motor operates normally no matter the passive member is locked.

9 Claims, 17 Drawing Sheets

PROTECTOR FOR PREVENTING MOTOR DAMAGE

BACKGROUND OF THE INVENTION

Field of the Invention

The present invention relates to a protector, especially to a protector for preventing motor damage.

Description of Related Art

Motors convert electrical energy to mechanical energy. Then kinetic energy of the mechanical energy is used to turn electric appliances of other devices. The motor is one of our daily essentials owing to its wide applications in areas such as heavy industry, small toys, etc.

The motor available now generally includes a motor shaft fit with a driving gear that is engaged with a link member. The link member is driven to move for power output when the motor is rotating. The on/off of the motor is controlled by an electric circuit.

The electric circuit cuts off the power when the motor is overloaded in order to avoid overheating and burn-out of the motor. But the motor shaft is unable to be stopped immediately when the power is cut off. Thus the motor shaft keeps rotating for a period of time after the cut-off. Once there is a larger resistance or torque force generated during the period, the driving gear or the link member is easily damaged.

According to different ways the motor is driven, there is a plurality of types of motors. Every revolution of the stepper motor is divided into a discrete number of steps and each step is the same size. The rotation of the motor is proportional to the pulse signals received. Thus the precise control of the position and the speed can be achieved and the stability is good. A driver that uses motors or other devices to move or rotate in steps generally includes a circuit board, a stepper motor, a reduction gear and an output gear. The circuit board is used for power supply to and speed control of the stepper motor. Then the energy is transmitted to the output gear for driving other devices to move or rotate in steps.

However, both the output gear and the reduction gear are unable to rotate when other devices stop moving or rotating due to an external force. Thus the motor shaft of the stepper motor is unable to rotate. At the moment, the circuit board keeps providing power to the stepper motor while the motor shaft of the stepper motor can't rotate. Thus the vibration and noises occur in the stepper motor. The stepper motor may be even damaged due to overloading.

Thus there is a room for improvement and there is a need to provide a novel protector for preventing motor damage while the passive member is locked.

SUMMARY OF THE INVENTION

Therefore it is a primary object of the present invention to provide a protector that prevents motor damage and allows normal operation of the motor no matter a passive member is locked or not.

In order to achieve the above object, a protector that prevents motor damage according to the present invention includes a link member, a damping member and a driver member. The link member is linked to a driving part of a motor while a mounting groove is disposed on one side thereof and a first insertion hole is arranged at a center thereof. The damping member with elasticity is placed in the mounting groove and disposed with a second insertion hole corresponding to the first insertion hole. The driver member is arranged with a projecting block on a center thereof and used for driving a passive member. A first surface of the driver member is covered on the mounting groove to form a receiving space. The projecting block is mounted in the second insertion hole while an inner edge of the second insertion hole is closely attached to an outer edge of the projecting block. The damping member is compressed in the receiving space so that an outer edge of the damping member is tightly attached to an inner edge of the mounting groove and the first surface of the driver member.

A friction resistance is generated by the damping member located in the receiving space. The motor still drives the driving part and the link member to rotate when the driver member stops rotating owing to an external force acted on the passive member and torque of the motor is larger than the friction resistance.

A protector for preventing motor damage according to the present invention includes a link member, a damping member, and a driver member. The link member is linked to a driving part of a motor. A center of the link member is disposed with a first insertion hole. The damping member with elasticity is located at one side of the link member and is arranged with a second insertion hole corresponding to the first insertion hole. The driver member is disposed with a projecting block on a center thereof and used for driving a passive member. A mounting groove is formed on a first surface of the driver member and the damping member is located in the mounting groove. One side of the link member is covered on the mounting groove to form a receiving space. The projecting block is mounted in the second insertion hole and an inner edge of the second insertion hole is closely attached to an outer edge of the projecting block. The damping member is compressed in the receiving space so that an outer edge of the damping member is tightly attached to an inner edge of the mounting groove and the first surface of the driver member.

A friction resistance is generated by the damping member located in the receiving space. The motor still drives the driving part and the link member to rotate when the driver member stops rotating owing to an external force acted on the passive member and torque of the motor is larger than the friction resistance.

The damping member is located in the receiving space while the projecting block is mounted in the second insertion hole and the inner edge of the second insertion hole is closely attached to the outer edge of the projecting block. Thus the outer edge of the damping member is tightly attached to the inner edge of the mounting groove and the first surface of the driver member and the friction resistance is generated therebetween. Therefore the motor still drives the driving part and the link member to rotate when the driver member stops rotating owing to an external force acted on the passive member and torque of the motor is larger than the friction resistance. The protector protects the motor from damages.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

The term used in the following descriptions and claims to represent specific component should be learned by a person skilled in the art. Hardware manufacturers may user different terms to call the same component. The components of the present invention are differentiated according to the functionality they offer, instead of the term/their name. The "include", "consists of", and "comprising" used in the following descriptions and claims means "include, but not limited to".

In order to learn features and functions of the present invention, please refer to the following embodiments and detailed descriptions.

Figure 3A:
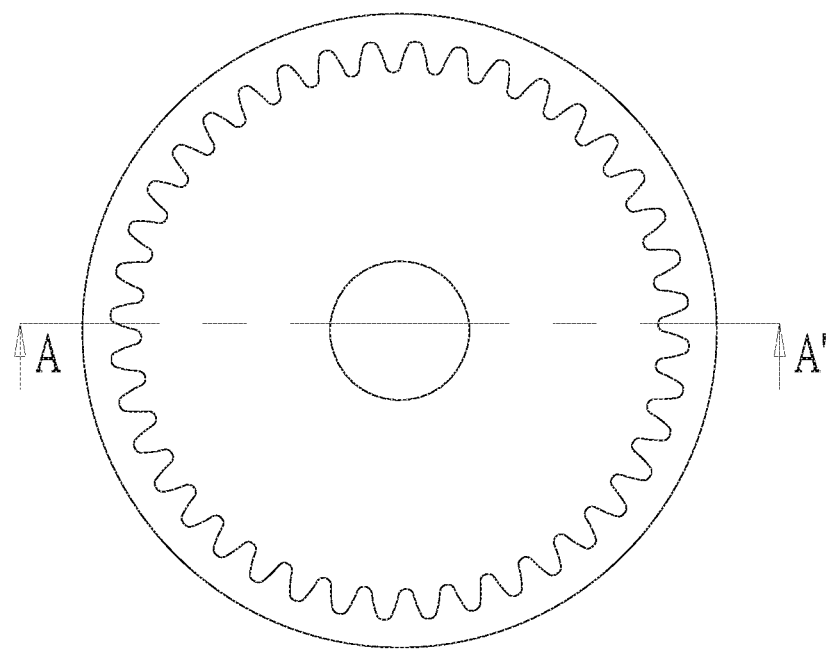
FIG. 3A is a top view of an embodiment of a protector for preventing motor damage according to the present invention.
Figure 3B:
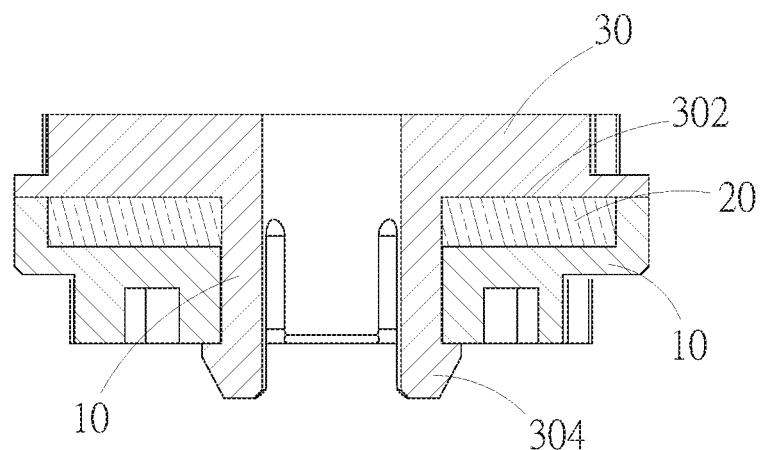
FIG. 3B is a sectional view along a line AA' of the embodiment in FIG. 3A according to the present invention.
Figure 4:
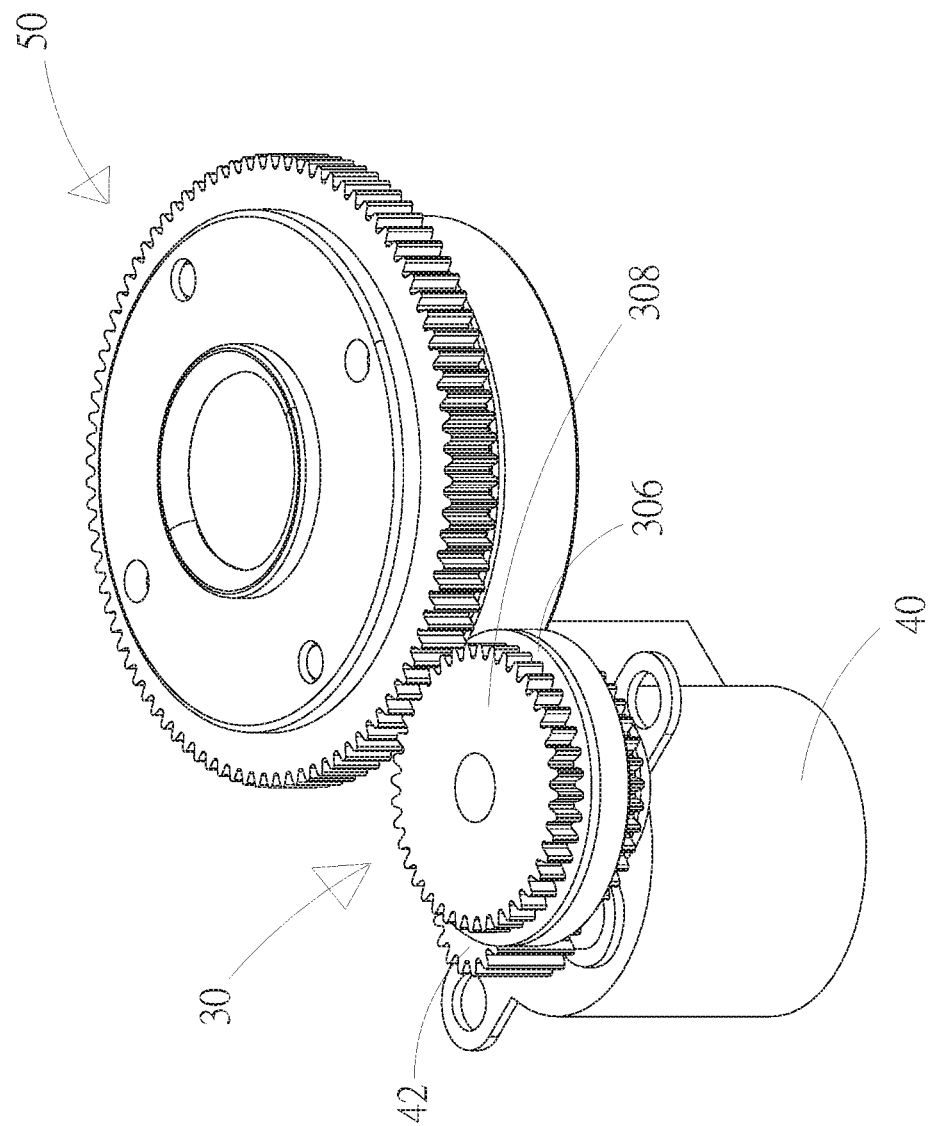
FIG. 4 is a perspective view showing a connection among an embodiment of a protector, a motor and a passive member according to the present invention.

Refer from FIG. 1 to FIG. 4, an embodiment of a protector for preventing motor damage 1 according to the present invention is revealed. The protector for preventing motor damage 1 includes a link member 10, a damping member 20, and a driver member 30. The link member 10 is linked to a driving part 42 of a motor 40 (as shown in FIG. 4). A mounting groove 100 is disposed on one side of the link member 10 and a first insertion hole 102 is arranged at a center of the link member 10.

The damping member 20 has elasticity because it's made from elastic material such as down, sponge, rubber, etc. The damping member 20 is placed in the mounting groove 100 and is disposed with a second insertion hole 202 corresponding to the first insertion hole 102. A projecting block 300 is set on a center of the driver member 30 while the driver member 30 is used to drive a passive member 50 (as shown in FIG. 4). A first surface 302 of the driver member 30 is covered on the mounting groove 100 so that a closed receiving space is formed in the mounting groove 100. The projecting block 300 is mounted in the second insertion hole 202 and an inner edge of the second insertion hole 202 is closely attached to an outer edge of the projecting block 300 while the damping member 20 is compressed in the receiving space. Thus an outer edge of the damping member 20 is tightly attached to an inner edge of the mounting groove 100 and the first surface 302 of the driver member 30.

The damping member 20 is squeezed vertically and then extended horizontally due to its elasticity when the first surface 302 of the driver member 30 is covered on the mounting groove 100 of the link member 10. Thus an upper and a lower surfaces of the damping member 20 are closely attached to the first surface 302 of the driver member 30 and a bottom surface of the mounting groove 100 while the damping member 20 being pressed by the first surface 302 of the driver member 30. Moreover, a periphery of the damping member 20 and an inner edge of the second insertion hole 202 are also in close contact with the inner edge at one side of the mounting groove 100 and the outer edge of the projecting block 300 respectively. Thus a friction resistance is generated by the damping member 20 located in the receiving space. The friction resistance makes the driver member 30 rotate along with the link member 10 while the link member 10 rotates under the condition that the motor 40 normally drives the passive member 50 to work. The motor 40 still drives the driving part 42 and the link member 10 to rotate when the driver member 30 stops rotating owing to an external force acted on the passive member 50 and torque of the motor 40 is larger than the friction resistance. Thereby the present invention uses the friction resistance generated by the damping member 20 closely attached to the projecting block 300, the mounting groove 100, and the first surface 302 of the driver member 30 for protecting the motor from damages when the driver member 30 stops rotating owing to an external force acted on the passive member 50 and torque of the motor 40 is larger than the friction resistance but the motor 40 still drives the driving part 42 and the link member 10 to rotate.

Figure 1:
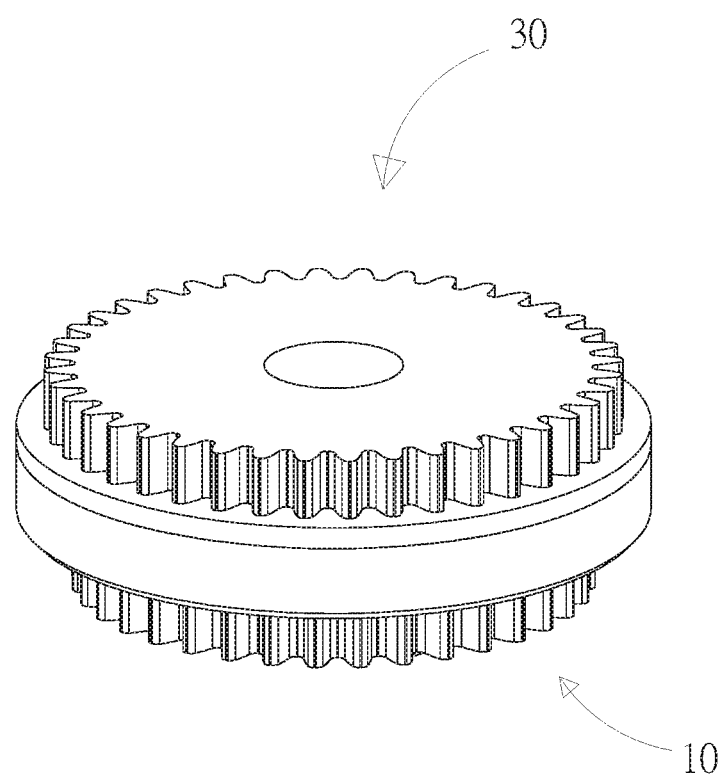
FIG. 1 is a perspective view of an embodiment of a protector for preventing motor damage according to the present invention.
Figure 2:
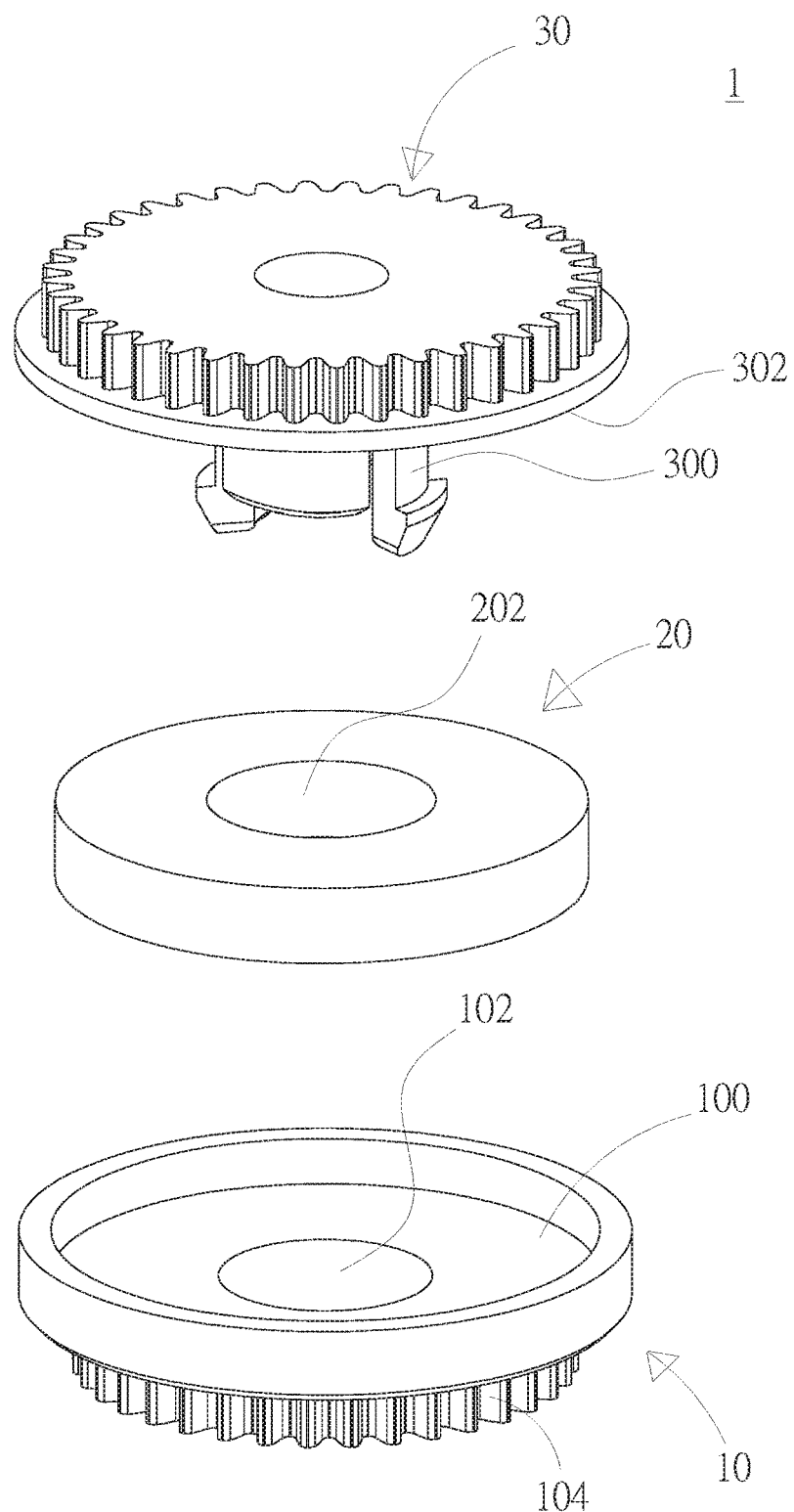
FIG. 2 is an explosive view of an embodiment of a protector for preventing motor damage according to the present invention.

Refer to FIG. 2 and FIG. 3B, the projecting block 300 includes a locking member 304. The locking member 304 is passed through the first insertion hole 102 and the second insertion hole 202 to be locked on an outer side of the link member 10. Thus the driver member 30 is tightly attached to the link member 10 but the driver member 30 is not fixed on the link member 10. Thereby the link member 10 can still be moved together with the driving part 42 of the motor 40 when the driver member 30 stops rotating owing to an external force acted on the passive member 50.

Figure 5:
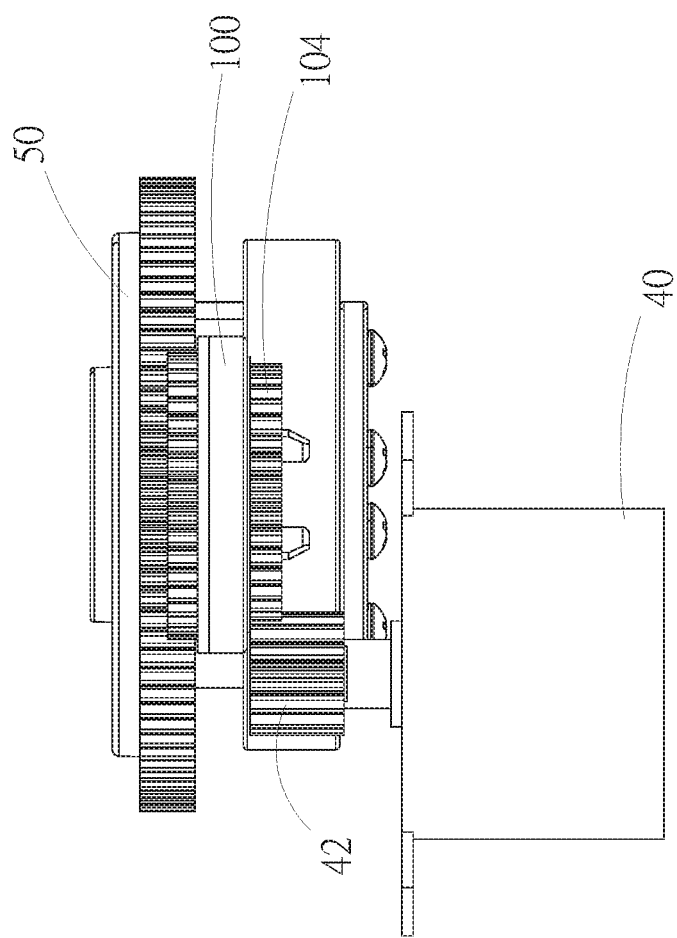
FIG. 5 is a side view showing connections among an embodiment, a motor and a passive member according to the present invention.
Figure 6:
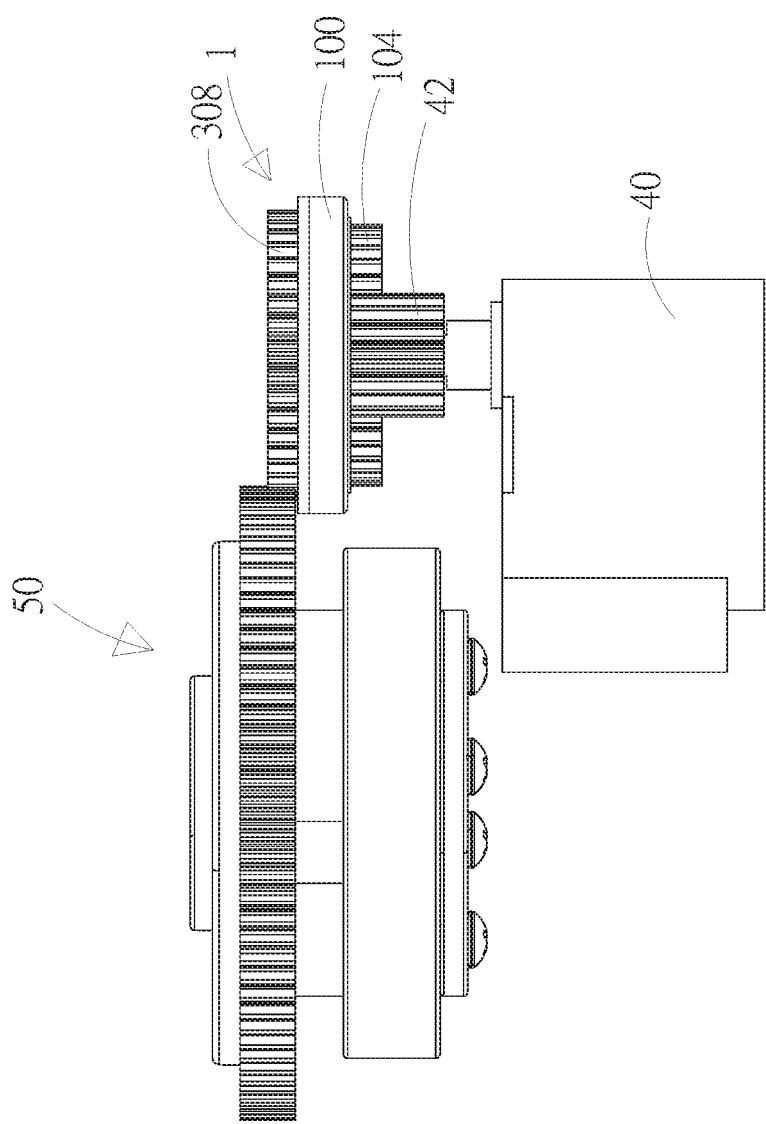
FIG. 6 is another side view showing connections among an embodiment, a motor and a passive member according to the present invention.

Refer to FIG. 4, FIG. 5 and FIG. 6, a connection among the protector 1, the motor 40 and the passive member 50 is revealed. As shown in the figures, the driving part 42 is a driving gear being passed through by a shaft of the motor 40. One side of the link member 10 is the mounting groove 100 while the other side thereof is disposed with a link gear 104 that is engaged with the driving gear. Thereby the shaft of the motor 40 starts rotating when the motor 40 is activated. At the moment, the driving gear is also rotated. Thus the link gear 104 is driven by the driving gear to be rotated along with the rotated driving gear because that the link gear 104 that is engaged with the driving gear.

A driver gear 308 is disposed on a second surface 306 of the driver member 30 and is engaged with a gear of the passive member 50. The first surface 302 and the second surface 306 are opposite to each other. The locking member 304 of the driver member 30 is locked on the link member 10 and the damping member 20 is located in the receiving space formed between the driver member 30 and the link member 10. Thus the driver member 30 is rotated along with the link member 10 when the link member 10 is rotated under normal operation. The gear of the passive member 50 is further driven by the driver gear 308 of the driver member 30 when the driver member 30 is rotated because the driver gear 308 is engaged with the gear of the passive member 50.

Under normal operation, a friction resistance is generated by the damping member 20 located in the receiving space between the driver member 30 and the link member 10. Thus the driver member 30 is rotated along with the rotating link member 10. The driver member 30 stops rotating along with the passive member 50 owing to the driver gear 308 engaged with the gear of the passive member 50 when the passive member 50 is stopped by an external force and the gear of passive member 50 is also stopped. At the moment, the link member 10 is still rotated when the torque of the motor 40 is larger than the friction resistance. Thus the motor 40 will not have noises, vibration or further burning out under normal operation when the passive member 50 is stopped by an external force and the shaft of the motor 40 is blocked.

Figure 7:
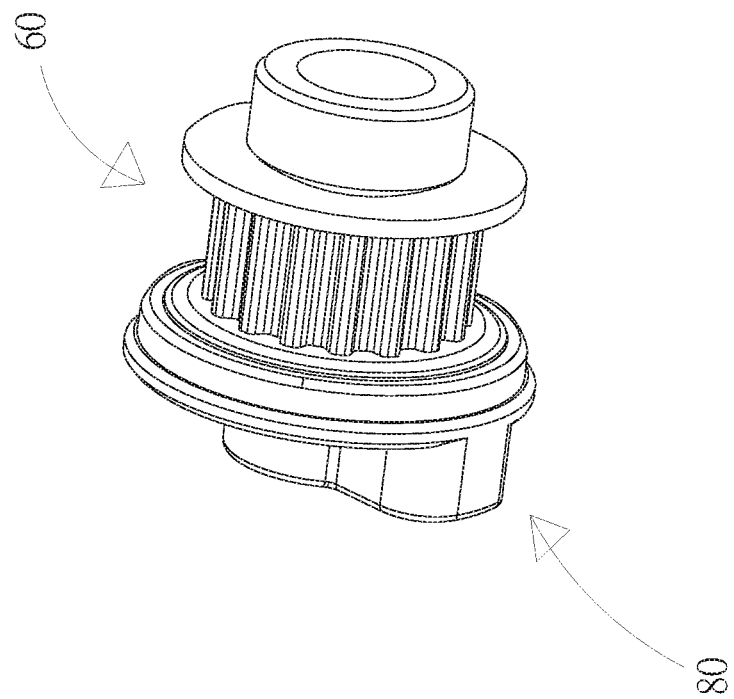
FIG. 7 is a perspective view of another embodiment of a protector for preventing motor damage according to the present invention.
Figure 8:
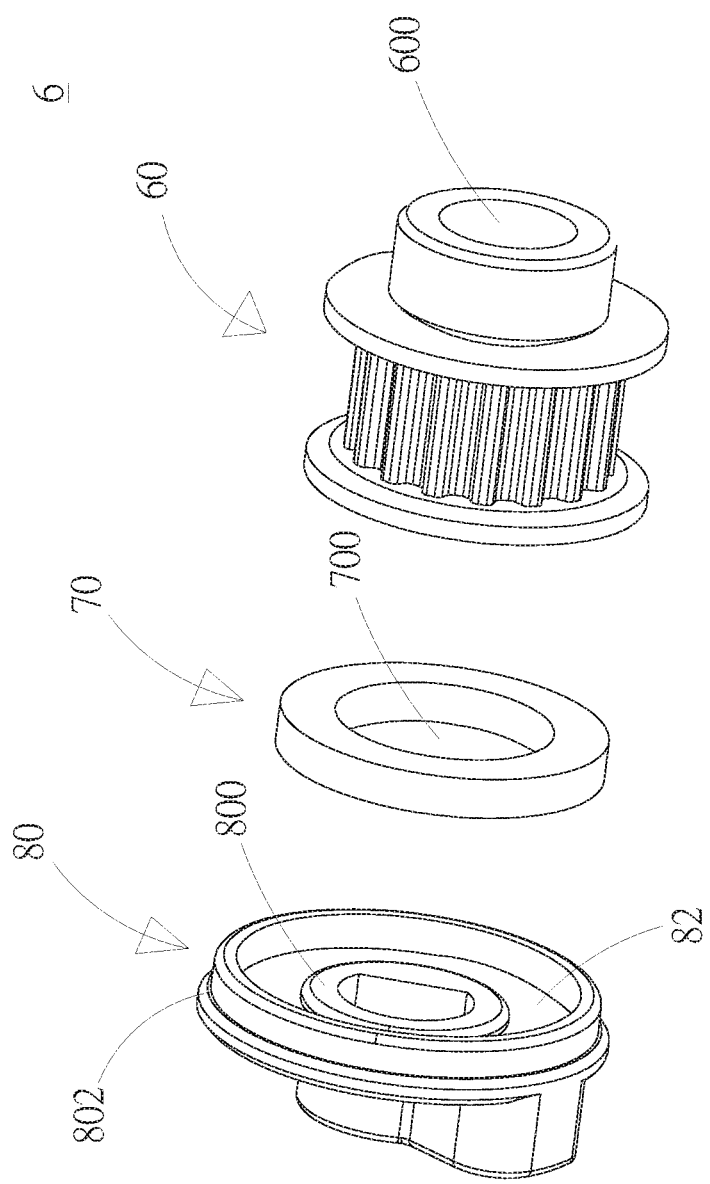
FIG. 8 is an explosive view of another embodiment of a protector for preventing motor damage according to the present invention.
Figure 9:
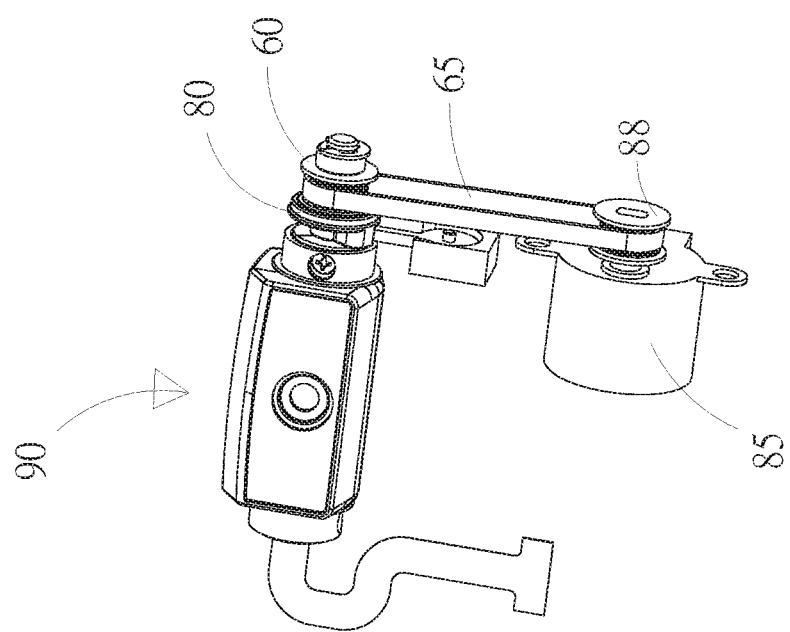
FIG. 9 is a perspective view showing an assembly of an embodiment, a motor and a passive member according to the present invention.

Refer to FIG. 7, FIG. 8 and FIG. 9, a perspective view of another embodiment of a protector for preventing motor damage 6 according to the present invention, an explosive view and a perspective view showing a connection among the protector for preventing motor damage 6, a motor 85 and a passive member 90 are revealed. A protector for preventing motor damage 6 includes a link member 60, a damping member 70, and a driver member 80. The link member 60 is linked to a driving part 88 of a motor 85. A first insertion hole 600 is arranged at a center of the link member 60. The damping member 70 having elasticity is located on one side of the link member 60 and is arranged with a second insertion hole 700 at the position corresponding to the first insertion hole 600. The driver member 80 is used t drive a passive member 90. A projecting block 800 is disposed on a center of the driver member 80 and a mounting groove 82 is formed on a first surface 802 of the driver member 80. The damping member 70 is mounted in the mounting groove 82. One side of the link member 60 is covered on the mounting groove 82 to form a receiving space. The projecting block 800 is mounted in the second insertion hole 700 and an inner edge of the second insertion hole 700 is closely attached to an outer edge of the projecting block 800 while the damping member 70 is compressed in the receiving space so that an outer edge of the damping member 70 is tightly attached to an inner edge of the mounting groove 82 and the first surface 802 of the driver member 80.

The motor 85 still drives the driving part 88 and the link member 60 to rotate owing to a friction resistance generated by the damping member 70 in the receiving space when the driver member 80 stops rotating owing to an external force acted on the passive member 90 and torque of the motor 85 is larger than the friction resistance. Thus a shaft of the motor 85 will not be blocked and damaged.

Figure 10:
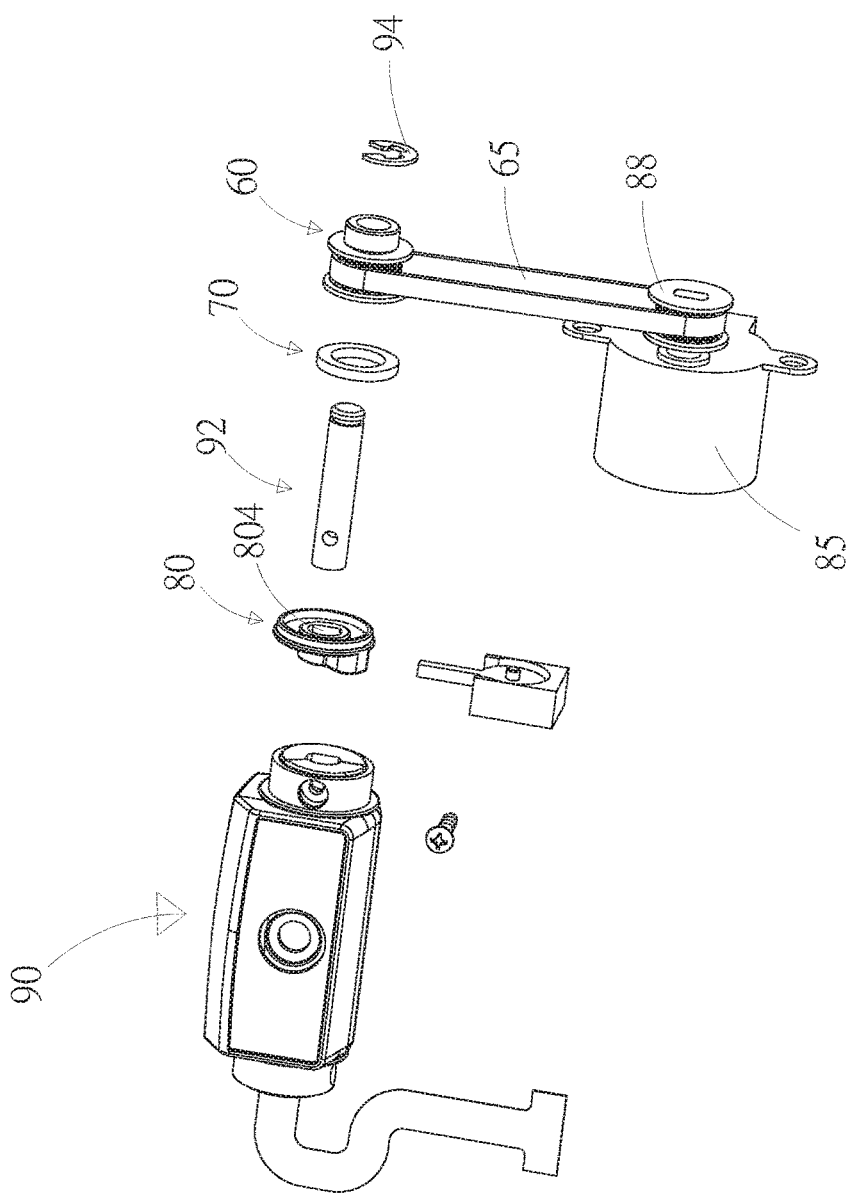
FIG. 10 is an explosive view of an assembly of an embodiment, a motor and a passive member according to the present invention.

Refer to FIG. 9 and FIG. 10, connections among the protector 6, the motor 85 and the passive member 90 are revealed. In this embodiment, the protector 6 is used to control the passive member 90 (that's a camera lens). The driving part 88 in this embodiment is a driving gear while a link gear 602 is disposed on the other side of the link member 60. A belt 65 is wound around the driving gear and the link gear 602 to form a transmission assembly. Thus the link gear 602 is further driven to move when the motor 85 turns the driving gear to rotate and the belt 65 is driven to move.

Figure 11:
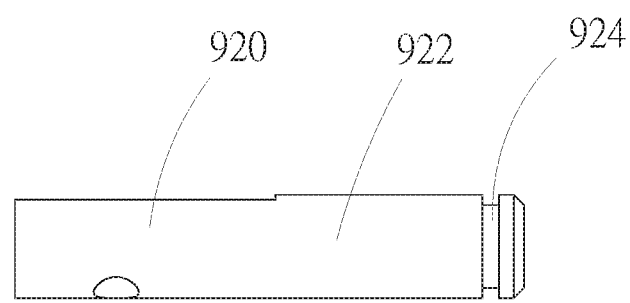
FIG. 11 is a top view of a shaft of a passive member in another embodiment according to the present invention.

The projecting block 800 is arranged with a fixing hole 804 corresponding to the first insertion hole 600 and the second insertion hole 700. The fixing hole 804 is a half-round hole. As shown in FIG. 11, a shaft 92 of the passive member 90 consists of a first fixing part 920, a shaft body 922, and a second fixing part 924. The shape of a front end of the first fixing part 920 is corresponding to the shape of the fixing hole 804 and is passed through the fixing hole 804 to be fixed on the passive member 90. One end of the shaft body 922 is connected to the first fixing part 920 and is passed through the first insertion hole 600 and the second insertion hole 700. The second fixing part 924 is connected to the other end of the shaft body 922 and is passed through the first insertion hole 600 to be held by a clamp 94.

Figure 12A:
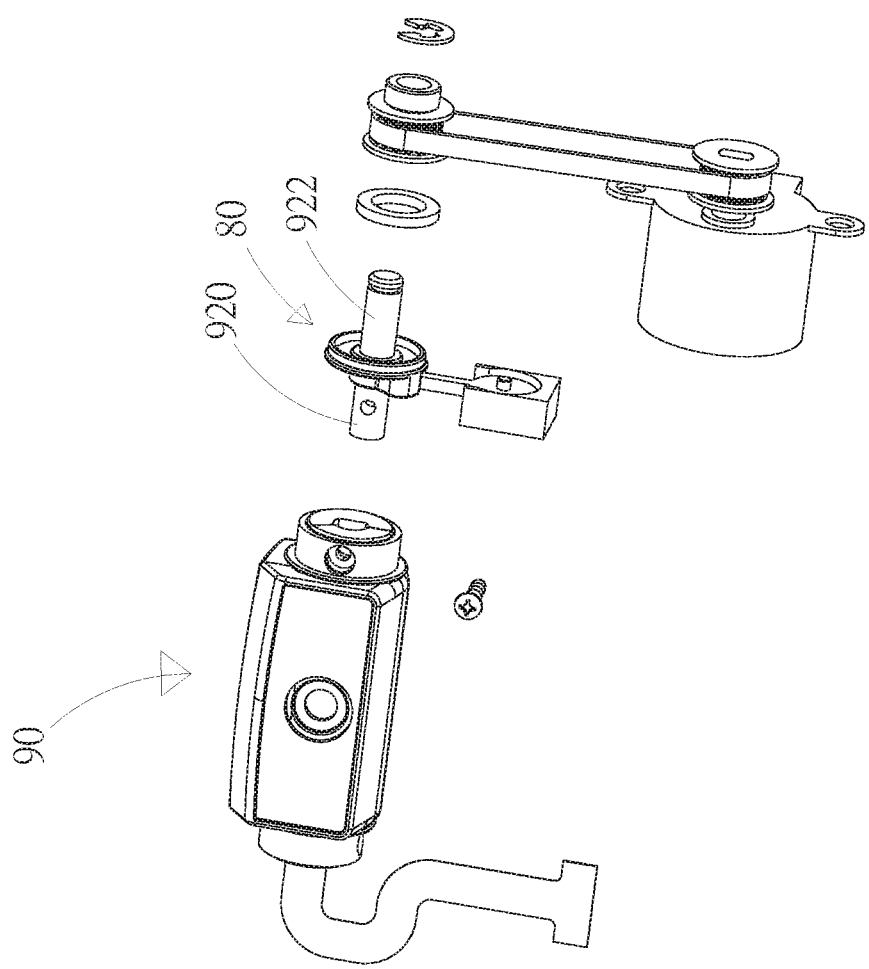
FIG. 12A is a schematic drawing showing assembling of an embodiment with a passive member according to the present invention.

Refer from FIG. 12A to FIG. 12D, an assembly process between the protector 6 and the passive member 90 is revealed. As shown in FIG. 12A, first the first fixing part 920 of the shaft 92 of the passive member 90 is passed through the fixing hole 804 of the driver member 80 while the shaft body 922 is locked by the fixing hole 804 because only the shape of the first fixing part 920 is corresponding to the shape of the fixing hole 804.

Figure 12B:
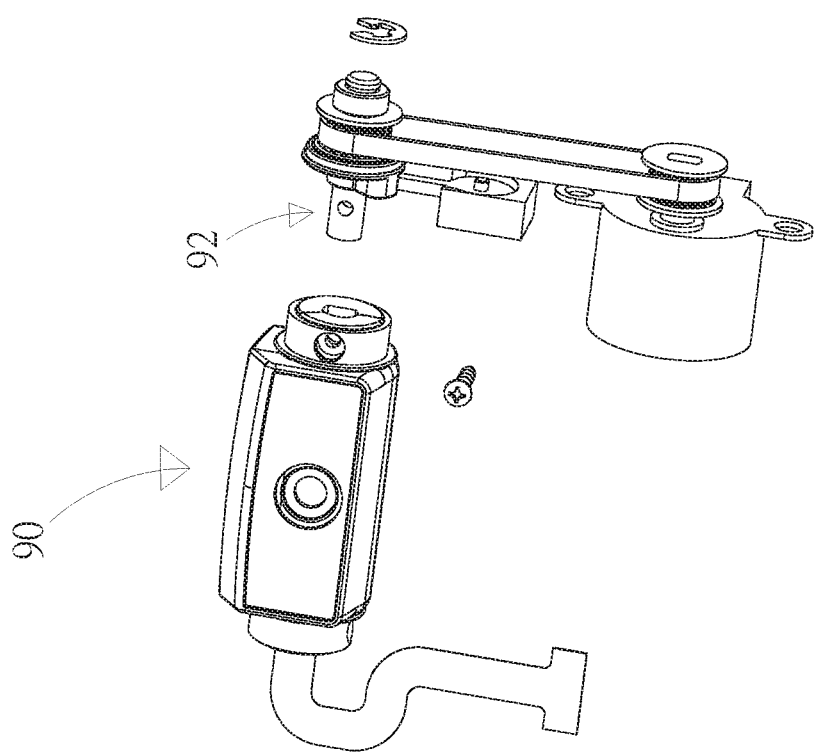
FIG. 12B is a schematic drawing showing assembling of an embodiment with a passive member according to the present invention.
Figure 12C:
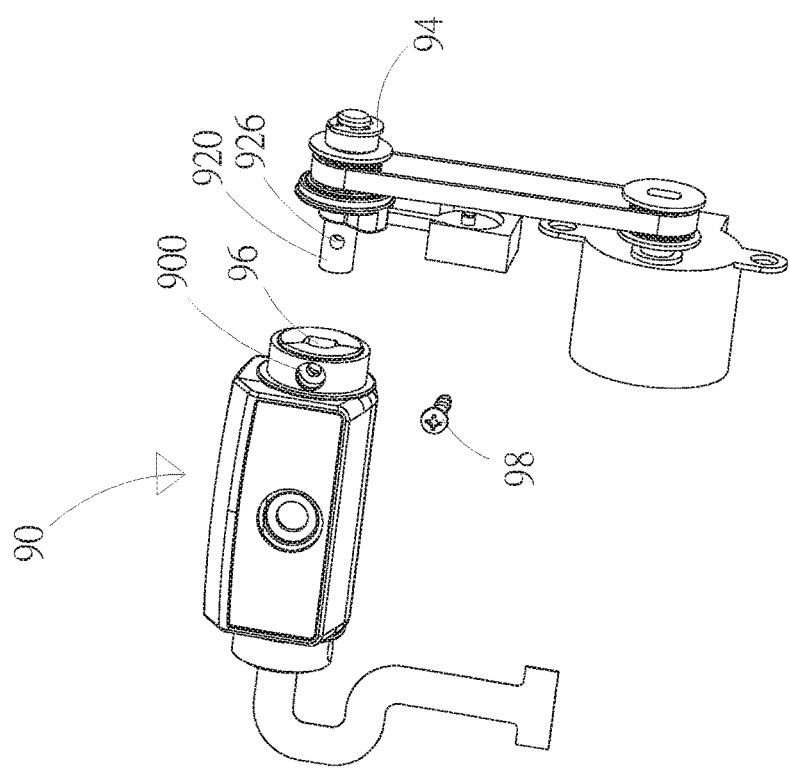
FIG. 12C is a schematic drawing showing assembling of an embodiment with a passive member according to the present invention.
Figure 12D:
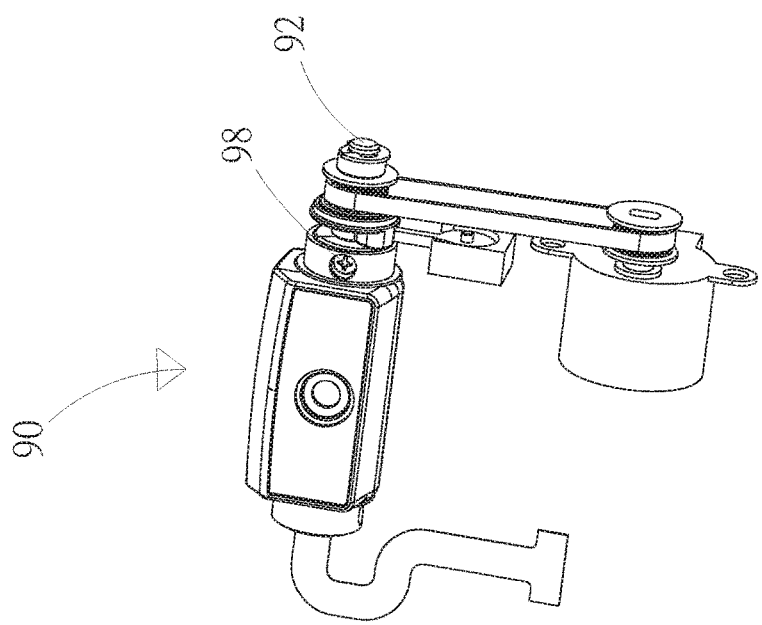
FIG. 12D is a schematic drawing showing assembling of an embodiment with a passive member according to the present invention.

As shown in FIG. 12B, the shaft body 922 and the second fixing part 924 of the shaft 92 of the passive member 90 are inserted through the second insertion hole 700 and the first insertion hole 600 so that the second fixing part 924 of the shaft 92 is came out of the first insertion hole 600. Then refer to FIG. 12C, the clamp 94 is fastened on the second fixing part 924 so that the shaft body 922 of the shaft 92 is pivotally connected to the first insertion hole 600 and the second insertion hole 700. Next as shown in FIG. 12D, the first fixing part 920 of the shaft 92 is passed through a connection hole 96 of the passive member 90 (shown in FIG. 12C) and a first fastening hole 926 of the first fixing part 920 is aligned with a second fastening hole 900 of the passive member 90. A screw 98 is used to fasten the first fastening hole 926 with the second fastening hole 900 so as to fix the shaft 92 on the passive member 90.

Figure 13:
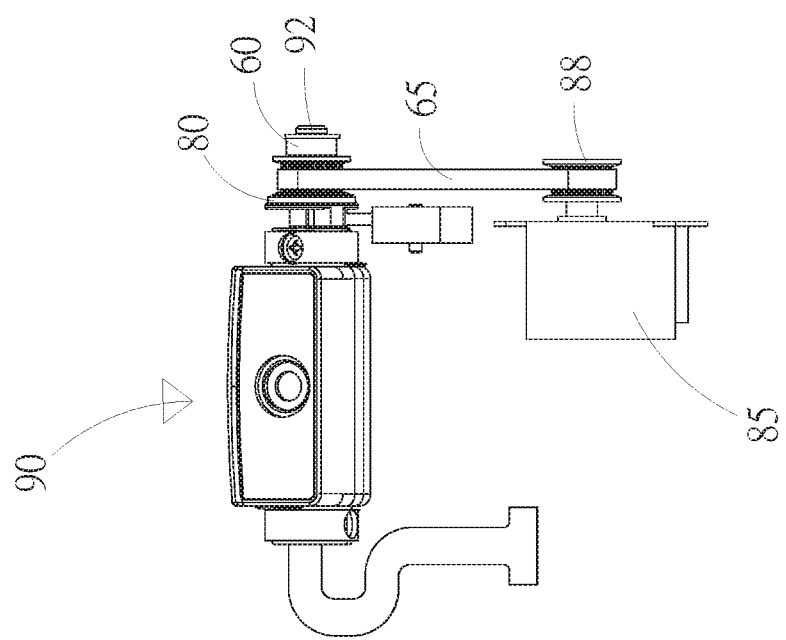
FIG. 13 is a front view of an embodiment according to the present invention.

Refer to FIG. 13, the motor 85 turns the driving gear to rotate and drive the belt 65 to move under normal operation. Thus the link gear 602 is further driven to move. The link member 60 is connected to the driver member 80 due to the first fixing part 920 and the second fixing part 924 of the shaft 92 of the passive member 90 and the damping member 70 is compressed in the receiving space between the link member 60 and the driver member 80. Thus the driver member 80 starts rotating when the link member 60 rotates. The passive member 90 is also rotated along with rotation of the driver member 80 because that the first fixing part 920 of the shaft 92 is fixed in the fixing hole 804 of the driver member 80 and the shaft 92 is fastened on the passive member 90. Thereby the passive member 90 is also rotated under normal rotation and operation of the motor 85. However, the driver member 80 stops rotating when the passive member 90 is stopped by an external force under normal operation of the motor 85. Now the motor 85 still turns the link member 60 to rotate when torque of the motor 85 is larger than a friction resistance generated by the damping member 70 in the receiving space. Thus the motor 85 will not be stopped along with the stopped passive member 90 and will not be damaged under such condition.

Figure 14:
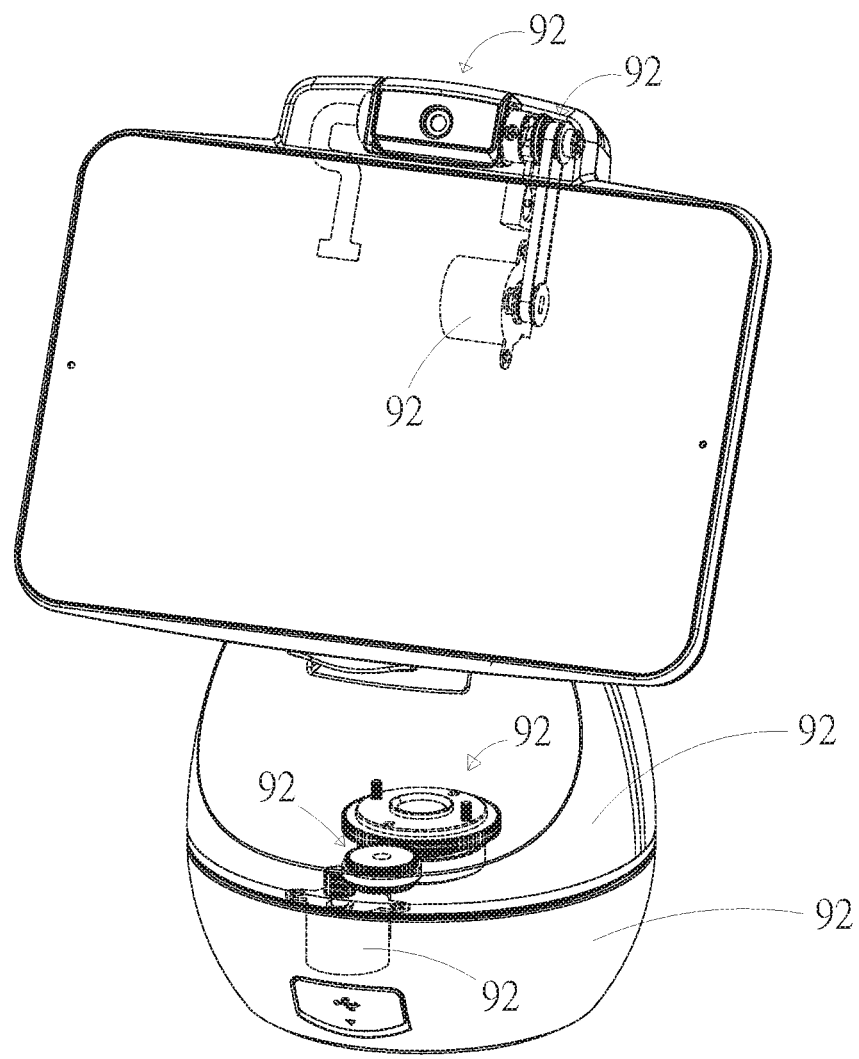
FIG. 14 is a schematic drawing showing two embodiments being applied to a companion robot at the same time according to the present invention.

Refer to FIG. 14, both the embodiments of the protectors 1, 6 are applied to a companion robot 99. The first embodiment of the protector 1 is applied to a horizontal rotation between an upper half 990 and a base 992 of the companion robot 99. The passive member 50 is connected to the upper half 990 of the companion robot 99 and is further driven to rotate when the motor 40 operates to turn the protector 1 to rotate. Thus the upper half 990 of the companion robot 99 is further driven to rotate. The way how the passive member 50 is connected to the upper half 990 of the companion robot 99 is not limited.

The second embodiment of the protector 6 can be applied to vertical rotation of a lens (the passive member 90) of the companion robot 99. The protector 6 is driven by the rotating motor 85 to rotate and the lens is further driven by the protector 6 to rotate vertically.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A protector for preventing motor damage comprising:
   a link member linked to a driving part of a motor and having a mounting groove disposed on one side thereof and a first insertion hole arranged at a center thereof;
   a damping member that is having elasticity, mounted in the mounting groove and disposed with a second insertion hole corresponding to the first insertion hole; and
   a driver member arranged with a projecting block at a center thereof and used for driving a passive member;
   wherein a first surface of the driver member is covered on the mounting groove to form a receiving space; the projecting block is mounted in the second insertion hole while an inner edge of the second insertion hole is closely attached to an outer edge of the projecting block; the damping member is compressed in the receiving space so that an outer edge of the damping member is tightly attached to an inner edge of the mounting groove and the first surface of the driver member.

2. The device as claimed in claim 1, wherein a friction resistance is generated by the damping member located in the receiving space; the motor still drives the driving part and the link member to rotate when the driver member stops rotating owing to an external force acted on the passive member and torque of the motor is larger than the friction resistance.

3. The device as claimed in claim 1, wherein the driving part is a driving gear and a link gear is set on the other side of link member; the link gear is engaged with the driving gear.

4. The device as claimed in claim 1, wherein a driver gear is disposed on a second surface of the driver member and is engaged with a gear of the passive member; the first surface of the driver member and the second surface of the driver member are opposite to each other.

5. The device as claimed in claim 1, wherein the projecting block includes a locking member which is passed through the first insertion hole and the second insertion hole to be locked on an outer side of the link member.

6. A protector for preventing motor damage comprising:
   a link member that is linked to a driving part of a motor and is disposed with a first insertion hole on a center thereof;
   a damping member that is having elasticity, located at one side of the link member and is arranged with a second insertion hole corresponding to the first insertion hole; and
   a driver member that is disposed with a projecting block on a center thereof and a mounting groove on a first surface thereof, and used for driving a passive member;
   wherein the damping member is located in the mounting groove; one side of the link member is covered on the mounting groove to form a receiving space; the projecting block is mounted in the second insertion hole and an inner edge of the second insertion hole is closely attached to an outer edge of the projecting block; the damping member is compressed in the receiving space so that an outer edge of the damping member is tightly attached to an inner edge of the mounting groove and the first surface of the driver member.

7. The device as claimed in claim 6, wherein a friction resistance is generated by the damping member located in the receiving space; the motor still drives the driving part and the link member to rotate when the driver member stops rotating owing to an external force acted on the passive member and torque of the motor is larger than the friction resistance.

8. The device as claimed in claim 6, wherein the driving member is a driving gear while a link gear is disposed on the other side of the link member; a belt is wound around the driving gear and the link gear so that the link gear is further driven to move when the motor turns the driving gear to rotate and the belt is driven to move.

9. The device as claimed in claim 6, wherein the projecting block is arranged with a fixing hole corresponding to the first insertion hole and the second insertion hole; a shaft of the passive member includes a first fixing part, a shaft body, and a second fixing part; the first fixing part is passed through the fixing hole to be fixed on the passive member; one end of the shaft body is connected to the first fixing part and is passed through the first insertion hole and the second insertion hole; the second fixing part is connected to the other end of the shaft body and is passed through the first insertion hole to be held by a clamp.

* * * * *